United States Patent [19]

Joy et al.

[11] Patent Number: 4,861,234
[45] Date of Patent: Aug. 29, 1989

[54] LOW-NOISE PUMP ASSEMBLY

[75] Inventors: Theodore J. Joy, Mishawaka; Vivek V. Mohile; William L. Richards, both of South Bend, all of Ind.

[73] Assignee: Allied-Signal Inc., Morristown, N.J.

[21] Appl. No.: 250,197

[22] Filed: Sep. 28, 1988

[51] Int. Cl.$^4$ .............................................. F04B 1/06
[52] U.S. Cl. ................................... 417/273; 417/569; 74/55; 74/570
[58] Field of Search ............... 417/523, 454, 273, 554, 417/569; 91/491; 74/55, 570

[56] References Cited

U.S. PATENT DOCUMENTS

| | | | |
|---|---|---|---|
| 1,867,981 | 7/1932 | Mudd | 74/570 |
| 2,062,575 | 12/1936 | Henry | 64/11 |
| 2,297,619 | 9/1942 | Haberstump | 64/11 |
| 3,423,957 | 1/1969 | Palmer | 64/6 |
| 3,527,547 | 9/1970 | Dieter et al. | 417/203 |
| 4,063,433 | 12/1977 | Chanton | 64/11 R |
| 4,332,532 | 6/1982 | Liska | 417/273 |
| 4,474,541 | 10/1984 | Siewert | 417/273 |

FOREIGN PATENT DOCUMENTS

| | | |
|---|---|---|
| 2243127 | 3/1974 | Fed. Rep. of Germany . |
| 2323269 | 11/1974 | Fed. Rep. of Germany . |
| 0757348 | 9/1956 | United Kingdom ............ 91/491 |
| 1390520 | 4/1975 | United Kingdom . |
| 1429497 | 3/1976 | United Kingdom . |

Primary Examiner—Carlton R. Croyle
Assistant Examiner—Robert N. Blackmon
Attorney, Agent, or Firm—Larry J. Palguta; Ken C. Decker

[57] ABSTRACT

The low-noise pump assembly (10) comprises a unitized assembly wherein a drive shaft (17) of the motor (16) is mated directly with an eccentric coupling (23). The eccentric coupling (23) has a through bore (21) which receives at one end the drive shaft (17) and at the other end a center post (30) of the pump housing. Disposed between the center post (30) and eccentric coupling (23) is a radially inner bearing mechanism (60), and disposed between the exterior of the eccentric coupling (23) and an opening (52) of a ring member (50) is a radially outer bearing mechanism (70). The ring member (50) engages at least one reciprocating piston assembly (45). Rotation of the drive shaft (17) causes rotation of the eccentric coupling (23) to effect reciprocating motion of the pump piston (48).

11 Claims, 2 Drawing Sheets

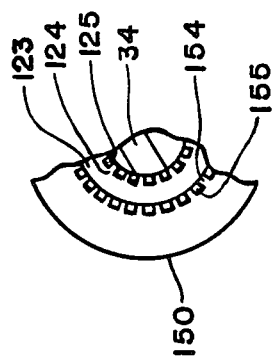
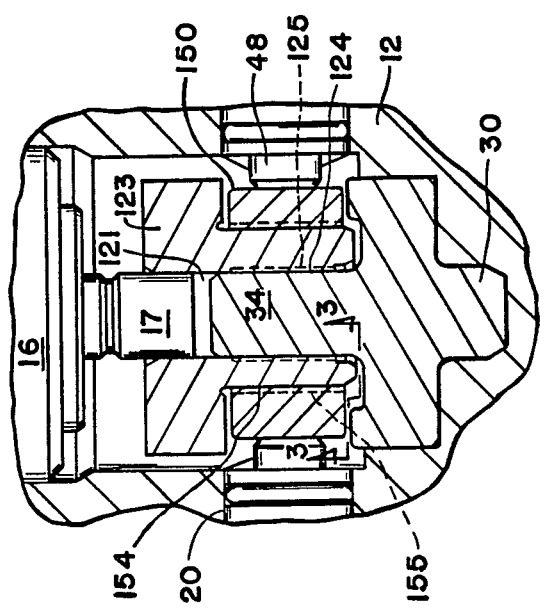

LOW-NOISE PUMP ASSEMBLY

The present invention relates to a low-noise pump assembly, and in particular a low-noise pump assembly utilizing multiple bearings to effect a low-noise output.

Automotive anti-skid systems typically utilize a hydraulic pump assembly to provide pressure for the hydraulic circuits of the anti-skid system. Because of space considerations and cost factors, the pump assembly should be as small as possible, include as few parts as feasible, and provide a low-noise output level so that the entire assembly operates quietly. Typically, an electric motor is attached to and drives a radial pump assembly which includes reciprocating radial pistons. It is advantageous to reduce the size of the motor and pump assembly while requiring as few assembly parts as possible, and all resulting in a quietly operating pump assembly.

The pump assembly of the present invention comprises motor means mounted to a pump housing, the pump housing having a pump opening into which extends a drive shaft of said motor means, at least one pump piston extending into said pump opening and a center post disposed at one end of the pump opening, an eccentric coupling having a bore therethrough, the drive shaft and center post extending into the bore and aligned coaxially, inner bearing means disposed between said center post and bore, a ring member disposed about said eccentric coupling and engaging said piston, the ring having an inner ring opening, and radially outer bearing means disposed between the exterior of said eccentric coupling and within the inner ring opening, so that rotation of said shaft by the motor means effects rotation of the eccentric coupling to effect reciprocating movement of the piston.

One way of carrying out the invention is described in detail below with reference to the drawings which illustrate two embodiments, in which:

FIG. 2 is a section view of the pump assembly of FIG. 1 but which includes different sets of bearing means; and FIG. 3 is a partial section view taken along view line 3—3 of FIG. 2.

Figure 1:
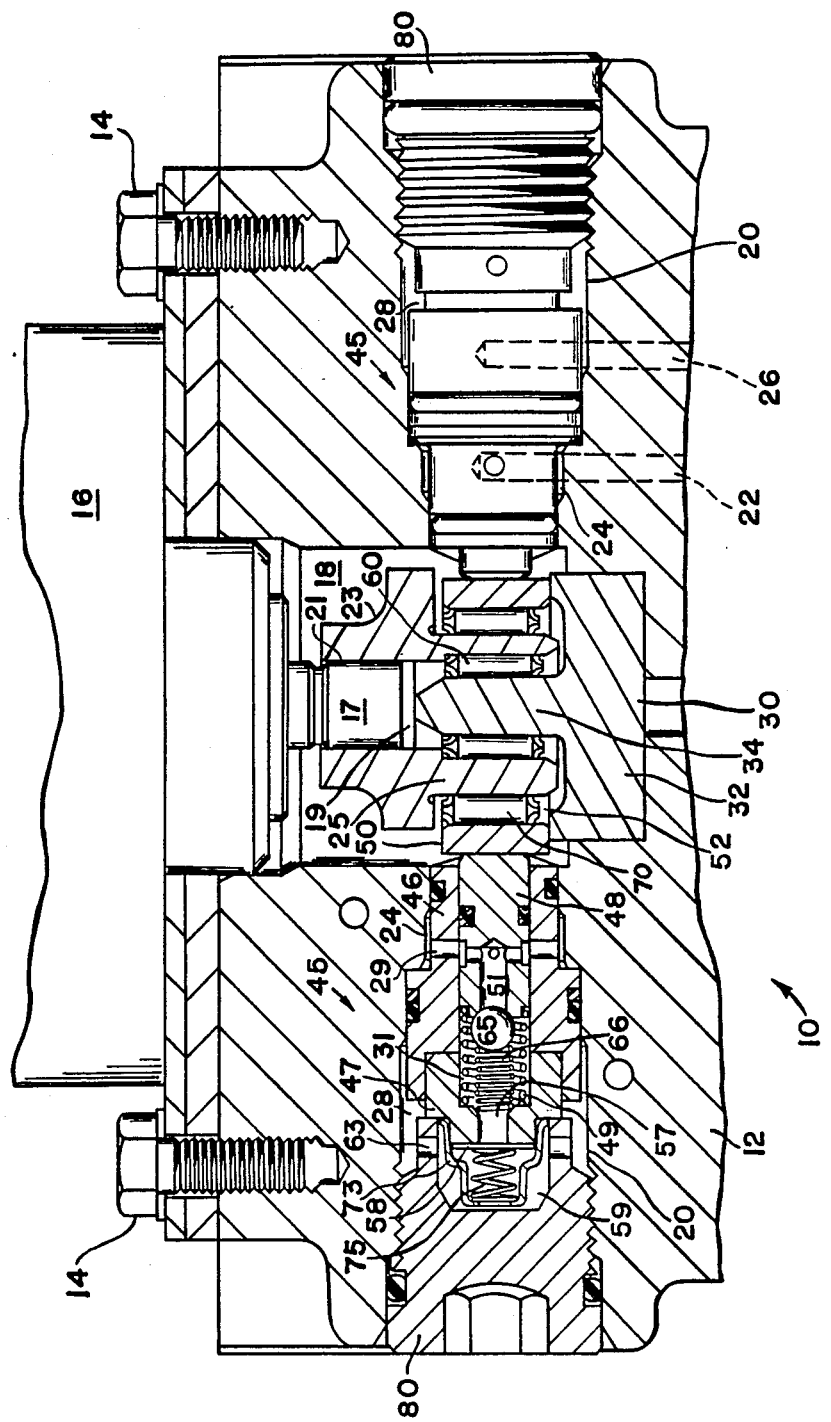
FIG. 1 is a section view of the pump assembly of the present invention.

The pump assembly of the present invention is indicated generally by reference numeral 10 in FIG. 1. Pump assembly 10 comprises a pump housing 12 to which is coupled, by means of bolts 14, a motor 16. The motor may be an electric motor or any other type of motor which performs the required driving function. Pump housing 12 includes a pump opening 18 which communicates with a pair of lateral bores 20. Each lateral bore 20 includes an inlet chamber 24 which communicates with an inlet opening 22, and a peripheral outlet chamber 28 which communicates with an outlet opening 26. At one end of pump opening 18 is located a T-shaped center post 30 which includes a base 32 fixed to pump housing 12 and a shaft portion 34 which extends axially within pump opening 18. Motor 16 includes a shaft 17 which is received within a complementary shaped non-circular opening 19 of bore 21 disposed within eccentric coupling 23. Eccentric coupling 23 includes an eccentric portion 25 which is disposed about the shaft portion 34. Located about the circumference of eccentric portion 25 is a ring member 50. Ring member 50 includes a ring opening 52. The eccentric coupling 23 is mounted about center post 30 by means of radially inner bearing means 60. Disposed about the exterior of eccentric portion 25 is radially outer bearing means 70 which engages the surface of ring opening 52.

Each lateral bore 20 includes a reciprocating piston assembly 45 which includes a piston housing 46 held within bore 20, a pump piston 48 biased by first resilient means 49, and a ball valve 65 biased by second resilient means 66 in intake chamber 31. The piston 48 includes an opening 51 that communicates with the piston housing inlet opening 29. Piston housing 46 includes an end member 47 which has an outlet opening 57 that communicates with the outlet chamber 59. Outlet chamber 59 communicates with an outlet opening 63 that permits fluid to flow into peripheral outlet chamber 28 and outlet opening 26. Within outlet chamber 59 is a cage 73 which provides a seat for an outlet valve spring 75 which biases an outlet valve or flap valve 58 into engagement with the outlet opening 57. Each piston assembly 45 is held in bore 20 by means of a cap member 80.

The pump assembly of the present invention operates to effect reciprocating motion of the pump pistons 48. As shaft 17 is rotated by the motor 16, eccentric coupling 23 is rotated about stationary center post 30 so that ring member 50 is caused to move back and forth laterally by eccentric portion 25. The lateral movement of ring member 50 causes a reciprocating motion of each of the pistons 48. As each piston 48 is displaced radially toward shaft portion 34, fluid is sucked in from inlet opening 22 and through inlet opening 29. The increase of fluid pressure within opening 51 causes the ball valve 65 to move away from opening 51 and permit fluid to be sucked into the intake chamber 31. As piston 48 is then moved laterally away from shaft portion 34 as a result of the rotating movement of eccentric portion 25, ball valve 65 prevents hydraulic fluid within intake chamber 31 from exiting back through opening 51 and inlet opening 29. The hydraulic fluid within intake chamber 31 is forced out of outlet opening 57 and past outlet valve 58, into outlet chamber 59, through outlet openings 63 and peripheral outlet chamber 28 to outlet opening 26. When piston 48 has reached its maximum radially outer stroke, outlet valve 58 can close and prevent fluid from returning toward inlet opening 29 during the intake stroke of piston 48.

The pump assembly of the present invention provides substantial advantages over prior pump designs. First, the direct coupling of shaft 17 to the eccentric coupling 23 which is disposed about shaft portion 34 by way of radially inner bearing means 60, results in the eccentric assembly accomplishing the dual function of sustaining pump piston loads while supporting loading of the motor. The direct coupling of the motor shaft to the eccentric assembly enables a reduction in the overall pump assembly height, in addition to providing an easier-to-assemble and disassemble construction. The piston assemblies can be installed before the motor is attached, which is preferable during manufacturing so that the motor will not be damaged during the final assembly. Significantly, the pump assembly requires fewer parts. There is typically utilized various coupling parts between the motor shaft and eccentric coupling, these having been entirely eliminated. There are fewer parts which can vibrate and the entire assembly is more rigid due to the reduction in the height of the unit. The utilization of radially inner and outer bearing means also contributes to a very quietly operating pump assembly.

FIG. 2 illustrates in section view the pump assembly disclosed in FIG. 1, but with a different form of bearing means utilized for the radially inner and outer bearing means. The eccentric coupling 123 now includes a bore 121 wherein there are disposed in axial alignment with shaft portion 34 a plurality of lands 124 and grooves 125. Between the lands and grooves and shaft portion 34 is a lubricant. Likewise, ring member 150 also includes a plurality of lands 154 and grooves 155 which are disposed about the exterior surface eccentric coupling 123. Between the lands and grooves of ring member 150 and exterior surface of eccentric coupling 123 is the lubricant. The eccentric coupling 123 and ring member 150 may be made of powdered metal and comprise the recently developed patterned bearing bore which provides a very effective and long-lived bearing assembly and which can replace needle bearings such as those illustrated in FIG. 1. The patterned bearing bore is disclosed in Maciag et al. U.S. Pat. No. 4,758,202 incorporated by reference herein. The lands and grooves permit an elastohydrodynamic film to develop that can support bearing loads. The grooves serve as reservoirs for the lubricant and as pockets for entrapping contaminants and wear debris. This type of bearing means may be utilized in place of the needle bearings disclosed in FIG. 1, with a significant savings in cost realized while providing bearings that operate as well as the needle bearings.

While the invention has been described with respect to the detailed embodiments, it will be understood that the invention is capable of numerous rearrangements, modifications, and alterations, and such are intended to be within the scope of the appended claims.

We claim:

1. A pump assembly, comprising motor means mounted to a pump housing, the pump housing having a pump opening into which extends a drive shaft of said motor means, at least one pump piston extending into said pump opening and a center post disposed at one end of the pump opening, an eccentric coupling having a bore therethrough, the drive shaft and center post extending into the bore and aligned coaxially, said eccentric coupling directly coupled to said drive shaft, inner bearing means disposed between said center post and bore, a ring member disposed about said eccentric coupling and engaging said piston, the ring member having an inner ring opening, and radially outer bearing means disposed between the exterior of said eccentric coupling and within the inner ring opening, so that rotation of said shaft by the motor means effects rotation of the eccentric coupling to effect reciprocating movement of the piston.

2. The pump assembly in accordance with claim 1, wherein the center post is essentially T-shaped, a top portion of the T disposed fixedly within said pump housing and a shaft portion of the T extending within the bore of the eccentric coupling.

3. The pump assembly in accordance with claim 2, wherein the eccentric coupling includes an eccentrically shaped portion which is disposed between said inner and outer radial bearing means.

4. The pump assembly in accordance with claim 3, wherein the pump assembly includes a second pump piston, each pump piston cooperating with a respective ball valve and outlet valve of the pump assembly.

5. The pump assembly in accordance with claim 4, wherein each pump piston is disposed within a piston housing located within a respective lateral bore in the pump housing, each piston being biased by resilient means and having an end adjacent the associated ball valve, the ball valve biased by second resilient means.

6. The pump assembly in accordance with claim 5, wherein each lateral bore includes a cage providing a seat for third resilient means which biases the associated outlet valve over an outlet opening of the piston housing.

7. The pump assembly in accordance with claim 6, wherein the cage is connected with an end member of the piston housing, the piston housing, end member, and cage insertable and removable as a unit in the respective lateral bore.

8. The pump assembly in accordance with claim 7, wherein each pump Piston has an opening that communicates with an inlet opening which communicates with an inlet chamber.

9. The pump assembly in accordance with claim 8, wherein each ball valve engages a valve seat of the associated opening of the pump piston.

10. The pump assembly in accordance with claim 6, wherein the cage is disposed in an outlet chamber defined by the piston housing and a cap member.

11. The pump assembly in accordance with claim 10, wherein the cap member has radial openings that communicate with a peripheral outlet chamber.

* * * * *